US009312984B2

(12) United States Patent
Nagata et al.

(10) Patent No.: US 9,312,984 B2
(45) Date of Patent: Apr. 12, 2016

(54) RADIO COMMUNICATION SYSTEM, RADIO BASE STATION APPARATUS, USER TERMINAL AND RADIO COMMUNICATION METHOD

(71) Applicant: NTT DOCOMO, INC., Tokyo (JP)

(72) Inventors: Satoshi Nagata, Tokyo (JP); Xiang Yun, Beijing (CN); Xiaoming She, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 78 days.

(21) Appl. No.: 14/356,174

(22) PCT Filed: Nov. 1, 2012

(86) PCT No.: PCT/JP2012/078340
§ 371 (c)(1),
(2) Date: May 5, 2014

(87) PCT Pub. No.: WO2013/069537
PCT Pub. Date: May 16, 2013

(65) Prior Publication Data
US 2014/0286290 A1 Sep. 25, 2014

(30) Foreign Application Priority Data

Nov. 7, 2011 (JP) ................. 2011-243023

(51) Int. Cl.
*H04L 1/00* (2006.01)
*H04W 4/00* (2009.01)
(Continued)

(52) U.S. Cl.
CPC ............. *H04L 1/0026* (2013.01); *H04B 7/024* (2013.01); *H04B 7/0617* (2013.01);
(Continued)

(58) Field of Classification Search
CPC ....... H04L 1/0026; H04L 1/0693; H04L 1/28; H04L 5/0035; H04L 5/0057; H04L 5/0073; H04B 7/024; H04B 7/0617; H04B 7/0619; H04B 7/0626; H04B 7/0632; H04B 17/24; H04B 17/309; H04W 72/085; H04W 72/1231; H04J 11/005; H04J 11/0053
USPC ................. 370/310–350, 431–463, 235–240, 370/249–253; 455/7–25, 421–466
See application file for complete search history.

(56) References Cited

U.S. PATENT DOCUMENTS 8,599,810 B2* 12/2013 Sun ......................... H04B 7/024
370/338
9,071,961 B2* 6/2015 Koo ....................... H04W 16/02
(Continued)

FOREIGN PATENT DOCUMENTS

WO 2011/043328 A1 4/2011

OTHER PUBLICATIONS

International Search Report for corresponding International Application No. PCT/JP2012/078340, mailed Jan. 22, 2013 (1 page).
(Continued)

*Primary Examiner* — Tri H Phan
(74) *Attorney, Agent, or Firm* — Osha Liang LLP

(57) ABSTRACT

To reduce overhead of CSI feedback without decreasing throughput in applying CoMP transmission, a radio communication method of the invention is characterized in that a radio base station apparatus determines so that content of CSI to transmit to a serving cell to perform CoMP transmission as feedback is different from content of CSI to transmit to a coordinated cell as feedback, and notifies a user terminal of the content of CSI, and that the user terminal generates feedback information based on the content of CSI notified from the radio base station apparatus, and transmits the feedback information to radio base station apparatuses of cells that perform Coordinated Multi-Point transmission.

7 Claims, 9 Drawing Sheets

(51) Int. Cl.
  *H04L 5/00* (2006.01)
  *H04B 7/02* (2006.01)
  *H04B 7/06* (2006.01)
  *H04L 1/16* (2006.01)

(52) U.S. Cl.
  CPC .......... *H04B 7/0619* (2013.01); *H04B 7/0626* (2013.01); *H04L 1/0028* (2013.01); *H04L 5/0035* (2013.01); *H04L 5/0057* (2013.01); *H04L 1/1671* (2013.01)

(56) References Cited

U.S. PATENT DOCUMENTS

| | | | | |
|---|---|---|---|---|
| 9,084,272 B2* | 7/2015 | Lee | ............ | H04L 1/0045 |
| 9,131,405 B2* | 9/2015 | Park | ............ | H04B 7/024 |
| 2003/0054828 A1* | 3/2003 | Dent | ............ | H04B 7/005 |
| | | | | 455/450 |
| 2007/0127412 A1* | 6/2007 | Dent | ............ | H04B 7/005 |
| | | | | 370/329 |
| 2011/0170435 A1* | 7/2011 | Kim | ............ | H04L 5/0023 |
| | | | | 370/252 |
| 2012/0087310 A1* | 4/2012 | Hui | ............ | H04B 7/024 |
| | | | | 370/328 |
| 2012/0218962 A1* | 8/2012 | Kishiyama | ............ | H04B 7/0452 |
| | | | | 370/329 |
| 2015/0256317 A1* | 9/2015 | Wang | ............ | H04B 7/024 |
| | | | | 370/329 |
| 2015/0358064 A1* | 12/2015 | Benjebbour | ............ | H04B 7/0452 |
| | | | | 370/329 |

OTHER PUBLICATIONS

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action issued in corresponding Japanese Application No. 2011-243023, mailed Aug. 18, 2015 (5 pages).

* cited by examiner

| Serving Cell \ Coordinated Cell | SHORT-TERM COVARIANCE MATRIX | FINE QUANTIZATION CHANNEL MATRIX | LONG-TERM COVARIANCE MATRIX | PMI | ROUGH QUANTIZATION CHANNEL MATRIX |
|---|---|---|---|---|---|
| SHORT-TERM COVARIANCE MATRIX |  | — | — | — | — |
| FINE QUANTIZATION CHANNEL MATRIX | ○ |  | — | — | — |
| LONG-TERM COVARIANCE MATRIX | ○ | ○ |  | — | — |
| PMI | ○ | ○ | ○ |  | — |
| ROUGH QUANTIZATION CHANNEL MATRIX | ○ | ○ | ○ | ○ |  |

FIG. 3

RADIO COMMUNICATION SYSTEM, RADIO BASE STATION APPARATUS, USER TERMINAL AND RADIO COMMUNICATION METHOD

TECHNICAL FIELD

The present invention relates to a radio communication system, radio base station apparatus, user terminal and radio communication method applicable to a cellular system and the like.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband-Code Division Multiple Access). For the UMTS network, for the purpose of further increasing high-speed data rates, providing low delay and the like, Long Term Evolution (LTE) has been studied (Non-patent Literature 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)).

CITATION LIST

Non-Patent Literature

[Non-patent Literature 1] 3GPP, TR25.912 (V7.1.0), "Feasibility study for Evolved UTRA and UTRAN", September 2006

SUMMARY OF THE INVENTION

Technical Problem

In addition, as one of promising techniques to further improve system performance of LTE system, there is inter-cell orthogonalization. For example, in the LTE-A system, intra-cell orthogonalization is achieved by orthogonal multiple access both in uplink and downlink. In other words, in downlink, user terminals UEs (User Equipments) are orthogonalized in the frequency domain. Meanwhile, for inter-cell, interference randomizing by 1-cell frequency reuse is a base as in W-CDMA.

Therefore, the 3GPP (3rd Generation Partnership Project) has studied Coordinated Multi-Point transmission/reception (CoMP) as techniques for actualizing inter-cell orthogonalization. In CoMP transmission/reception, a plurality of cells coordinates to perform signal processing of transmission and reception on a single or a plurality of user terminals UEs. For example, in downlink, studied are plurality-of-cell simultaneous transmission applying precoding, Coordinated Scheduling/Beamforming and the like. By applying these CoMP transmission/reception techniques, it is expected to improve throughput characteristics of user terminals UEs particularly positioned at the cell edge.

To apply CoMP transmission/reception techniques, it is necessary that a user terminal transmits channel state information (CSI) on a plurality of cells to a radio base station apparatus as feedback. Therefore, overhead of CSI feedback is large. When overhead of CSI feedback is simply decreased, it is not possible to effectively apply CoMP transmission/reception techniques, and throughput is not improved.

The present invention was made in view of such respects, and it is an object of the invention to provide a radio communication system, radio base station apparatus, user terminal and radio communication method that enable overhead of CSI feedback to be reduced without decreasing throughput in applying CoMP transmission.

Solution to Problem

A radio communication system of the present invention is a radio communication system provided with a plurality of radio base station apparatuses, and a user terminal configured to be able to perform Coordinated Multi-Point transmission/reception with the plurality of radio base station apparatuses, and is characterized in that the radio base station apparatus includes a determination section that determines so that content of channel state information to transmit to a serving cell to perform Coordinated Multi-Point transmission as feedback is different from content of channel state information to transmit to a coordinated cell as feedback, and a notification section that notifies a user terminal of the content of channel state information, and that the user terminal includes a generation section that generates feedback information based on content of channel state information notified from the radio base station apparatus, and a transmission section that transmits the feedback information to radio base station apparatuses of cells that perform Coordinated Multi-Point transmission.

A radio base station apparatus of the invention is a radio base station apparatus in a radio communication system provided with a plurality of radio base station apparatuses, and a user terminal configured to be able to perform Coordinated Multi-Point transmission/reception with the plurality of radio base station apparatuses, and is characterized by including a determination section that determines so that content of channel state information to transmit to a serving cell to perform Coordinated Multi-Point transmission as feedback is different from content of channel state information to transmit to a coordinated cell as feedback, and a notification section that notifies a user terminal of the content of channel state information.

A user terminal of the invention is a user terminal in a radio communication system provided with a plurality of radio base station apparatuses, and a user terminal configured to be able to perform Coordinated Multi-Point transmission/reception with the plurality of radio base station apparatuses, and is characterized by including a generation section that generates feedback information based on content of channel state information notified from the radio base station apparatus, and a transmission section that transmits the feedback information to radio base station apparatuses of cells that perform Coordinated Multi-Point transmission.

A radio communication method of the invention is a radio communication method in a radio communication system provided with a plurality of radio base station apparatuses, and a user terminal configured to be able to perform Coordinated Multi-Point transmission/reception with the plurality of radio base station apparatuses, and is characterized by including the steps of, in the radio base station apparatus, determining so that content of channel state information to transmit to a serving cell to perform Coordinated Multi-Point transmission as feedback is different from content of channel state information to transmit to a coordinated cell as feedback, and notifying a user terminal of the content of channel state information, and, in the user terminal, generating feedback information based on the content of channel state information notified from the radio base station apparatus, and transmitting the feedback information to radio base station apparatuses of cells that perform Coordinated Multi-Point transmission.

Technical Advantage of the Invention

According to the present invention, it is possible to reduce overhead of CSI feedback without decreasing throughput in applying CoMP transmission.

BRIEF DESCRIPTION OF THE DRAWINGS

FIG. 3 is a table showing combinations of CSI contents of a serving cell and a coordinated cell;

DESCRIPTION OF EMBODIMENTS

An Embodiment of the present invention will specifically be described below with reference to accompanying drawings.

Figure 1A:
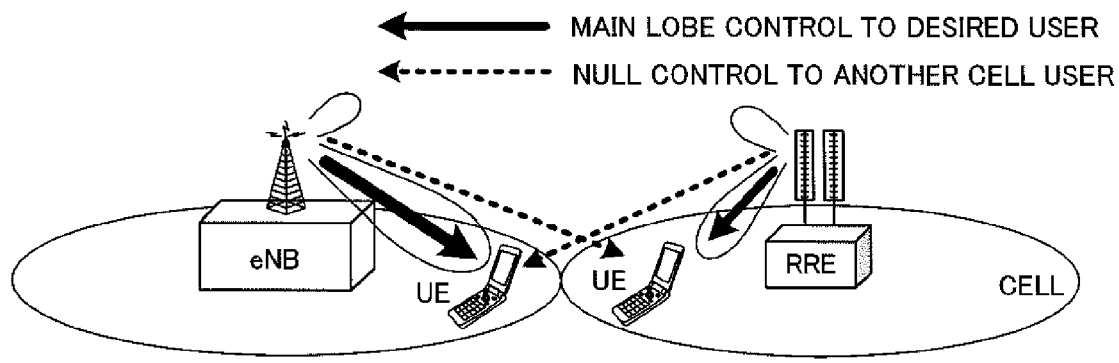
FIG. 1 contains diagrams to explain Coordinated Multi-Point transmission.
Figure 1B:
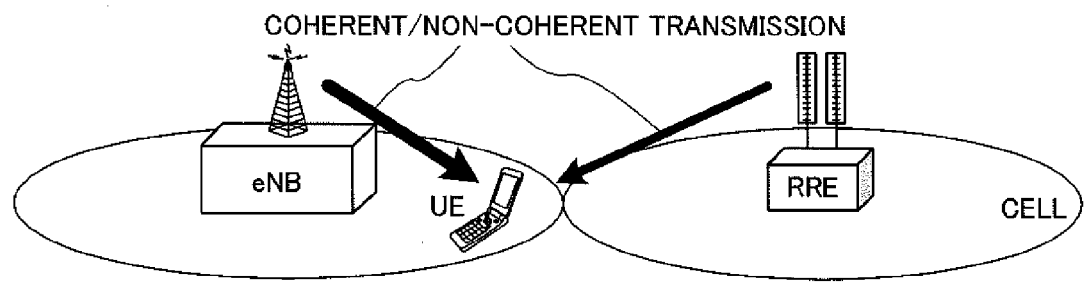
Figure 1C:
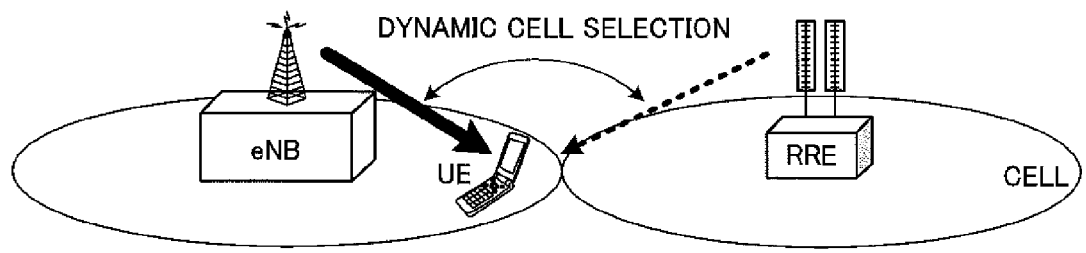

Downlink CoMP transmission will be described first with reference to FIG. 1. As downlink CoMP transmission, there are Coordinated Scheduling/Coordinated Beamforming and Joint processing. Coordinated Scheduling/Coordinated Beamforming is a method for transmitting a shared data channel to one user terminal UE from only one cell, where radio resources in the frequency/spatial domain are allocated with consideration given to interference from another cell and interference to another cell as shown in FIG. 1A. Meanwhile, Joint processing is a method for transmitting shared data channels from a plurality of cells at the same time by applying precoding, and has Joint transmission in which a plurality of cells transmits shared data channels to one user terminal UE as shown in FIG. 1B, and Dynamic Point Selection (DPS) in which one cell is instantaneously selected and transmits a shared data channel as shown in FIG. 1C.

Figure 2A:
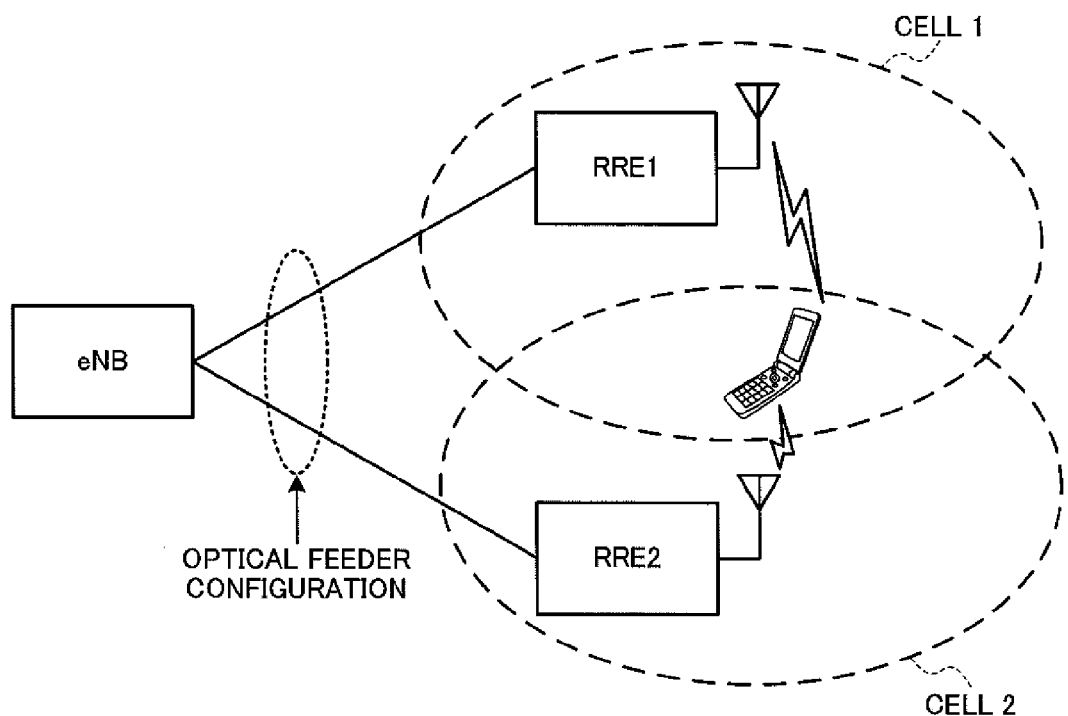
FIG. 2 contains schematic diagrams illustrating a configuration of a radio base station apparatus applied to Coordinated Multi-Point transmission.
Figure 2B:
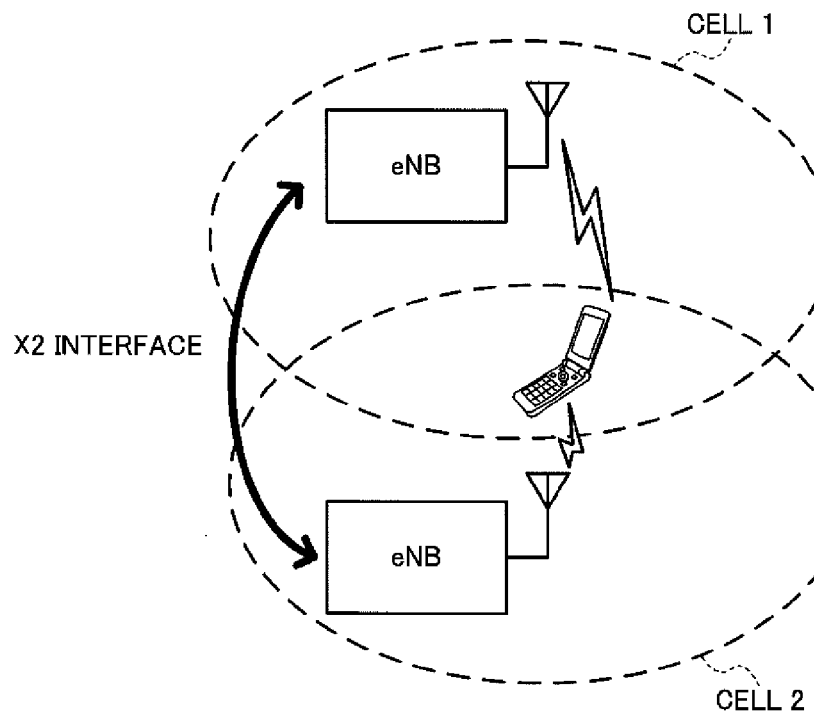

As a configuration to actualize CoMP transmission/reception, for example, there are a configuration (centralized control based on the RRE configuration) including a plurality of remote radio equipments (RREs) connected to a radio base station apparatus (radio base station apparatus eNB) with optical fibers or the like as shown in FIG. 2A, and another configuration (autonomous decentralized control based on the independent base station configuration) of a radio base station apparatus (radio base station apparatus eNB) as shown in FIG. 2B. In addition, FIG. 2A illustrates the configuration including a plurality of remote radio equipments RREs, and may be of a configuration including only a single remote radio equipment RRE as shown in FIG. 1.

In the configuration (RRE configuration) as shown in FIG. 2A, the radio base station apparatus eNB controls the remote radio equipments RRE1 and RRE2 in a centralized manner. In the RRE configuration, since the radio base station apparatus eNB (centralized base station) that performs baseband signal processing and control of a plurality of remote radio equipments RREs and each cell (i.e. each remote radio equipment RRE) are connected with baseband signals using optical fibers, the centralized base station is capable of collectively performing radio resource control among cells. In other words, the problems of delay of signaling between radio base station apparatuses eNBs and overhead are small, which become problems in the independent base station configuration, and high-speed radio resource control among cells is relatively made ease. Accordingly, in the RRE configuration, in downlink, it is possible to apply the method using high-speed inter-cell signal processing such as plurality-of-cell simultaneous transmission.

Meanwhile, in the configuration (independent base station configuration) as shown in FIG. 2B, each of a plurality of radio base station apparatuses eNBs (or RREs) performs radio resource allocation control such as scheduling. In this case, by using an X2 interface between the radio base station apparatus eNB of a cell 1 and the radio base station apparatus eNB of a cell 2, when necessary, timing information and radio resource allocation information such as scheduling is transmitted to any one of the radio base station apparatuses eNBs to perform coordination between cells.

CoMP transmission is applied to improve throughput of a user terminal existing at the cell edge. Therefore, it is controlled to apply CoMP transmission when a user terminal exists at the cell edge. In this case, a radio base station apparatus obtains a difference of quality information (for example, RSRP (Reference Signal Received Power)) for each cell from a user terminal, and in the case where the difference is a threshold or less i.e. in the case where the quality difference between cells is small, determines that the user terminal exists at the cell edge to apply CoMP transmission. Meanwhile, in the case where the difference of quality information for each cell exceeds the threshold i.e. in the case where the quality difference between cells is large, since the user terminal is close to a radio base station apparatus of either cell, the radio base station apparatus determines that the user terminal exists near the center of the cell, and does not apply CoMP transmission.

In the case of applying CoMP transmission, the user terminal transmits channel state information for each of a plurality of cells to the radio base station apparatus (radio base station apparatus of the serving cell) as feedback. Meanwhile, in the case of not applying CoMP transmission, the user terminal transmits the channel state information of the serving cell to the radio base station apparatus as feedback. Thus, when CoMP transmission is applied, since the user terminal transmits the channel state information for each of a plurality of cells as feedback, overhead of feedback information increases.

Herein, as the channel state information, there is channel state information for each cell, and inter-cell channel state information. In Joint transmission type CoMP, radio base station apparatuses of a plurality of cells transmit the same data with the same phase to a user terminal at the same timing. In this case, it is necessary to transmit inter-cell information as feedback so that the user terminal is capable of receiving the same data with the same phase at the same timing, together with the channel state information of each cell. As the channel state information for each cell, there are PMI (Precoding Matrix Indicator), CDI (Channel Distribution Information), CQI (Channel Quality Indicator) and the like, and as the inter-cell channel state information, there is phase difference information, amplitude difference information and the like.

The inventors of the present invention noted content of channel state information (CSI) in transmitting the above-mentioned channel state information as feedback. In applying CoMP transmission, information amounts notified from a user terminal are different between a serving cell (cell to which the user terminal is connected) and a coordinated cell (cell which coordinates with the serving cell in CoMP). Since the serving cell is connected to the user terminal, the information amount notified from the user terminal is large. Therefore, accuracy of feedback from the user terminal to the serving cell is required to be high. Meanwhile, for the coordinated cell, since the information amount notified from the user terminal is small, it is conceivable that it is not necessary to make feedback accuracy equal to that of the serving cell. Therefore, the inventors of the invention found out that it is possible to reduce overhead of feedback of the channel state information by making content of channel state information to transmit to a serving cell as feedback different from content of channel state information to transmit to a coordinated cell as feedback.

Further, the inventors of the invention actually measured how much the relative capacity changes due to the difference (quality difference) in the quality information for each cell, by changing content of inter-cell channel state information. At this point, content of CSI of a serving cell was set so that feedback accuracy was high, and content of CSI of a coordinated cell was set so that feedback accuracy was low. As a result, it is understood that the relative capacity was kept high. Further, when the quality difference is relatively large, it is understood that it is possible to obtain almost the same relative capacity as that in the case of setting content of CSI of a serving cell and content of CSI of a coordinated cell both so that feedback accuracy is high. In other words, when the quality difference is relatively large, it is understood that it is possible to maintain the relative capacity even by setting content of CSI of a coordinated cell so that feedback accuracy is low.

Therefore, the inventors of the invention found out that it is possible to reduce overhead of the channel state information to feed back by making content of CSI of a serving cell and content of CSI of a coordinated cell different from each other.

In other words, it is the gist of the invention to determine content of CSI to transmit to a serving cell to perform CoMP transmission as feedback and content of CSI to transmit to a coordinated cell as feedback to be different from each other to perform feedback, and to thereby reduce overhead of CSI feedback without decreasing throughput in applying CoMP transmission. Particularly, by determining content of channel state information so that accuracy of feedback to the serving cell is higher than accuracy of feedback to the coordinated cell, it is possible to reduce overhead of CSI feedback without decreasing throughput.

In the present invention, the content of channel state information is determined so that accuracy of feedback to a serving cell is higher than accuracy of feedback to a coordinated cell. By this means, it is possible to reduce overhead of channel state information (CSI) feedback. Further, in the invention, the content of CSI is defined by (1) short-term covariance matrix, (2) fine quantization channel matrix, (3) long-term covariance matrix, (4) precoding matrix indicator (PMI) or (5) rough quantization channel matrix. Herein, (1) the short-term covariance matrix is a covariance matrix at a subframe level or sub-band level. (2) The fine quantization channel matrix is a channel matrix of quantization (for example, the number of bits higher than the existing PMI) finer than granularity defined by the PMI. (3) The long-term covariance matrix is a covariance matrix of about several tens of milliseconds in the entire band. (5) The rough quantization channel matrix is a channel matrix of quantization (for example, the number of bits lower than the existing PMI) rougher than granularity defined by the PMI.

As described above, in the case of defining CSI with different feedback accuracy, feedback accuracy is (1) short-term covariance matrix>(2) fine quantization channel matrix>(3) long-term covariance matrix>(4) PMI>(5) rough quantization channel matrix in descending order of accuracy. Accordingly, in the case of determining content of channel state information so that accuracy of feedback to a serving cell is higher than accuracy of feedback to a coordinated cell, combinations of content of CSI to feed back to a serving cell and content of CSI to feed back to a coordinated cell are as shown in Table 3 (circles show available combinations.)

When there is a plurality of options in the combination of content of CSI to feed back to a serving cell and content of CSI to feed back to a coordinated cell, it is preferable to determine the CSI content by a method (first method) of selecting a combination that maximizes feedback accuracy, another method (second method) of determining the content of CSI to feed back to a coordinated cell based on reception quality notified from a user terminal or the like.

The first method will be described with reference to FIG. 3. For example, when the content of CSI to feed back to a serving cell is (1) the short-term covariance matrix, the option of the content of CSI to feed back to a coordinated cell is (2) the fine quantization channel matrix, (3) long-term covariance matrix, (4) PMI or (5) rough quantization channel matrix. In this case, in the first method, the content of CSI to feed back to a coordinated cell is set for (2) the fine quantization channel matrix with the highest accuracy among the options. Further, when the content of CSI to feed back to a serving cell is (2) the fine quantization channel matrix, the content of CSI to feed back to a coordinated cell is (3) the long-term covariance matrix, (4) PMI or (5) rough quantization channel matrix. In this case, in the first method, the content of CSI to feed back to a coordinated cell is set for (3) the long-term covariance matrix with the highest accuracy among the options. Furthermore, when the content of CSI to feed back to a serving cell is (3) the long-term covariance matrix, the content of CSI to feed back to a coordinated cell is (4) the PMI or (5) rough quantization channel matrix. In this case, in the first method, the content of CSI to feed back to a coordinated cell is set for (4) the PMI with the highest accuracy between the options.

In addition, it is possible to determine the content of CSI to feed back to a serving cell as appropriate corresponding to reception quality information of a user terminal (for example, determine the CSI content by a threshold determination as described above). Further, as the cell quality information, there are RSRP (Reference Signal Received power), RSRQ (Reference Signal Received Quality), SINR (Signal to Interference plus Noise Ratio) and the like.

In the second method, the content of CSI to feed back to a coordinated cell is associated with reception quality in a user terminal, and is determined corresponding to the reception quality. For example, when there is a plurality of options in the combination of content of CSI for a serving cell and content of CSI for a coordinated cell, a plurality of thresholds is beforehand set in association with reception quality, and the content of CSI for a coordinated cell is determined corresponding to reception quality of the coordinated cell. For example, when the content of CSI to feed back to a serving cell is (1) the short-term covariance matrix, the option of the content of CSI to feed back to a coordinated cell is (2) the fine quantization channel matrix, (3) long-term covariance matrix, (4) PMI or (5) rough quantization channel matrix. In this case, three different thresholds are set in association with the reception quality (first threshold, second threshold, and third threshold in descending order of reception quality). When the reception quality exceeds the first threshold, the content of CSI to feed back to a coordinated cell is set for (2) the fine quantization channel matrix. When the reception quality is the first threshold or less while exceeding the second threshold, the content of CSI to feed back to a coordinated cell is set for (3) the long-term covariance matrix. When the reception quality is the second threshold or less while exceeding the third threshold, the content of CSI to feed back to a coordinated cell is set for (4) the PMI. When the reception quality is the third threshold or less, the content of CSI to feed back to a coordinated cell is set for (5) the rough quantization channel matrix. Similarly, when the content of CSI to feed back to a serving cell is (2) the fine quantization channel matrix, the option of the content of CSI to feed back to a coordinated cell is (3) the long-term covariance matrix, (4) PMI or (5) rough quantization channel matrix. When the reception quality is the first threshold or less while exceeding the second threshold, the content of CSI to feed back to a coordinated cell is set for (3) the long-term covariance matrix. When the reception quality is the second threshold or less while exceeding the third threshold, the content of CSI to feed back to a coordinated cell is set for (4) the PMI. When the reception quality is the third threshold or less, the content of CSI to feed back to a coordinated cell is set for (5) the rough quantization channel matrix. Similarly, when the content of CSI to feed back to a serving cell is (3) the long-term covariance matrix, the option of the content of CSI to feed back to a coordinated cell is (4) the PMI or (5) rough quantization channel matrix. When the reception quality is the second threshold or less while exceeding the third threshold, the content of CSI to feed back to a coordinated cell is set for (4) the PMI. When the reception quality is the third threshold or less, the content of CSI to feed back to a coordinated cell is set for (5) the rough quantization channel matrix. Thus, in the second method, the content of CSI is determined so that feedback accuracy is lower as the reception quality is lower.

In addition, it is possible to determine the content of CSI to feed back to a serving cell as appropriate corresponding to reception quality information of a user terminal (for example, determine the CSI content by the threshold determination as described above). Further, as the cell quality information, there are RSRP, RSRQ, SINR and the like.

Figure 4:
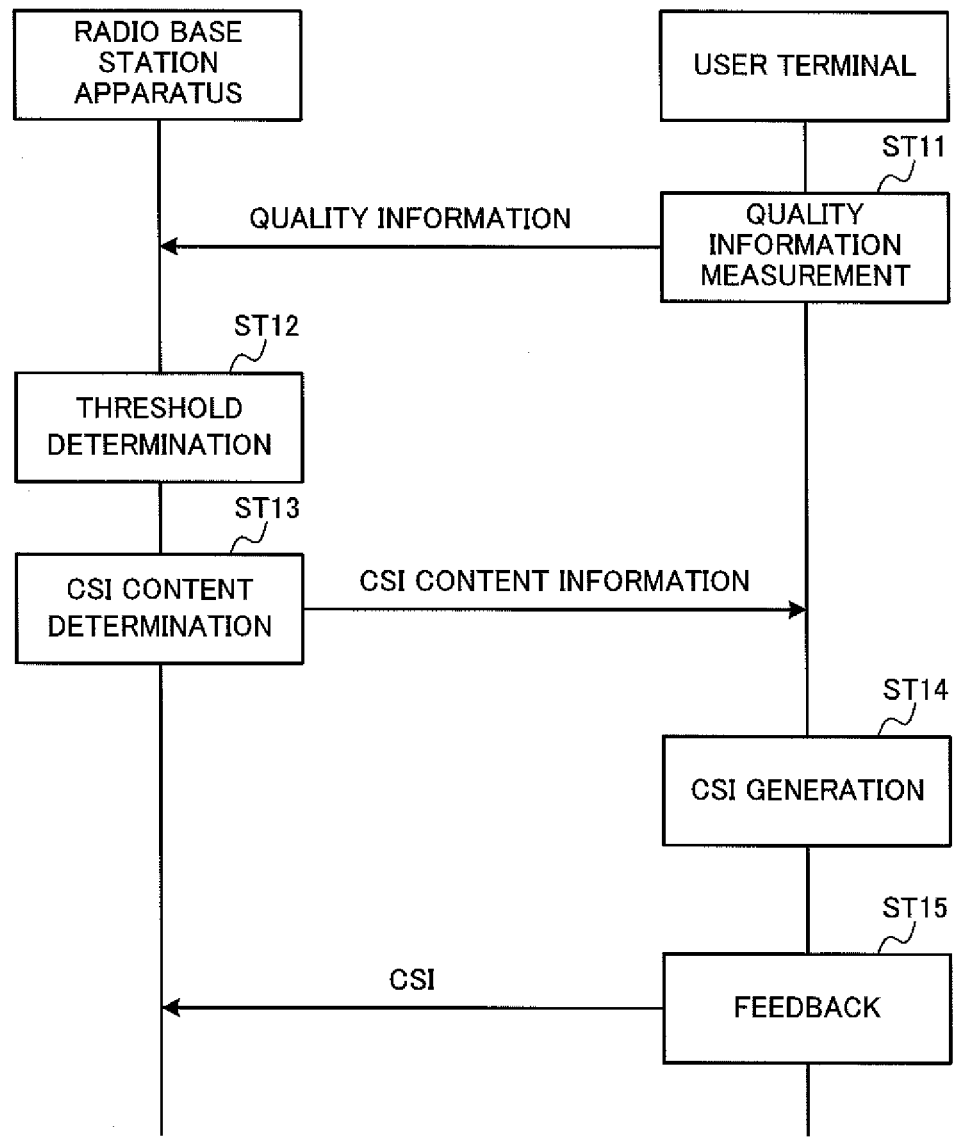
FIG. 4 is a sequence diagram illustrating a procedure between a radio base station apparatus and a user terminal.

Herein, a procedure of control according to the above-mentioned second method will be described with reference to FIG. 4. FIG. 4 is a sequence diagram illustrating the procedure between a radio base station apparatus and a user terminal.

First, a user terminal measures quality information (for example, RSRP) for each cell to perform Coordinated Multi-Point (ST11). The user terminal notifies a radio base station apparatus of the quality information by higher layer signaling, for example.

Next, the radio base station apparatus makes a threshold determination as described above on the reception quality (ST12). Next, the radio base station apparatus determines the content of CSI of the serving cell and coordinated cell as described above based on a result of the threshold determination (ST13). Subsequently, the radio base station apparatus notifies the user terminal of the CSI content information, for example, by higher layer signaling (RRC signaling, broadcast information).

Next, the user terminal generates CSI with the CSI content information notified from the radio base station apparatus (ST14). Then, the user terminal transmits thus generated CSI to radio base station apparatuses of cells that perform Coordinated Multi-Point transmission for each cell as feedback (ST15). According to such control according to the invention, it is possible to achieve a maximum 30 percentage reduction in overhead of feedback information in a state in which throughput in applying CoMP is maintained.

Figure 5:
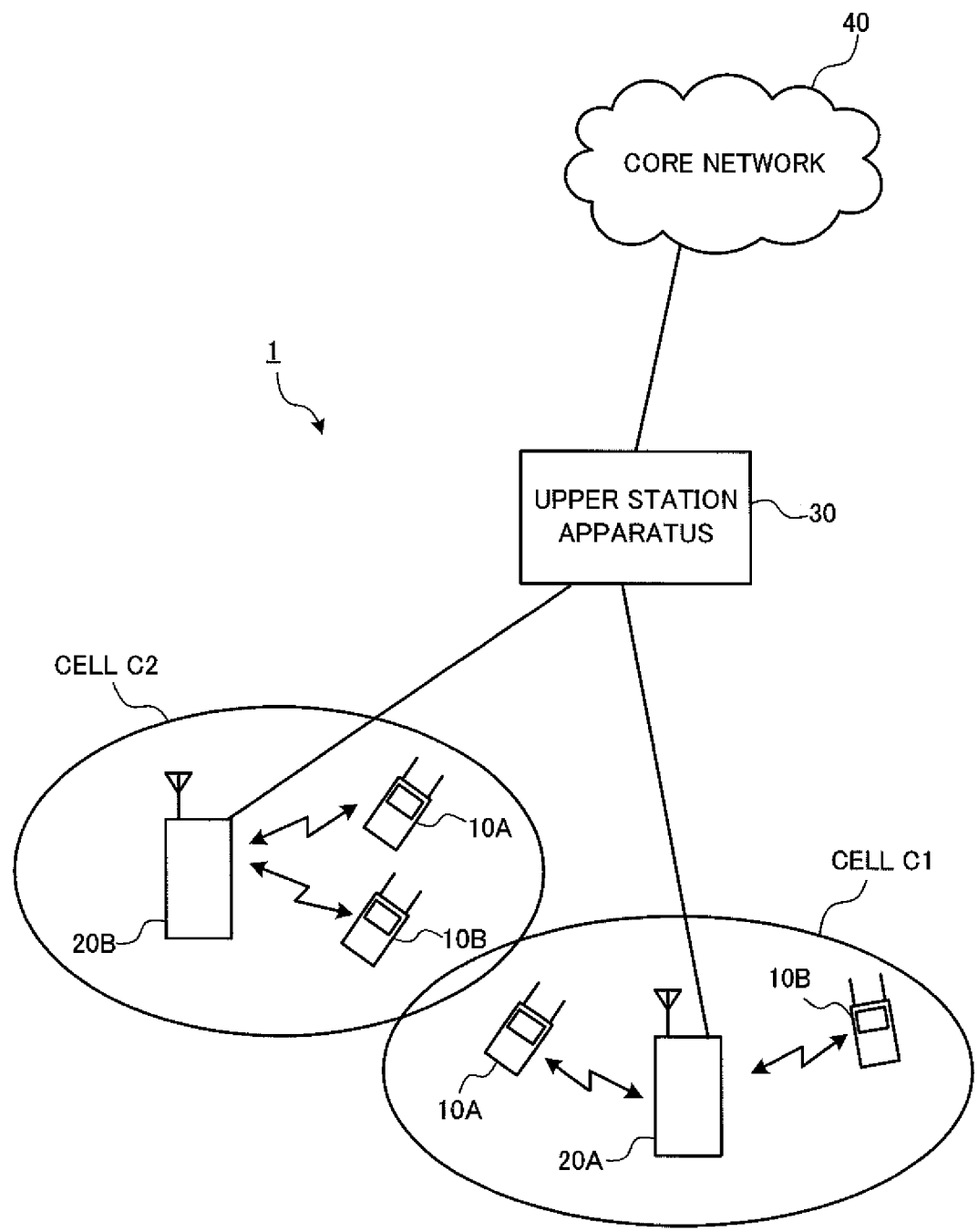
FIG. 5 is a diagram to explain a system configuration of a radio communication system.

A radio communication system according to the Embodiment of the invention will specifically be described below. FIG. 5 is an explanatory diagram of a system configuration of the radio communication system according to this Embodiment. In addition, the radio communication system as shown in FIG. 5 is a system including the LTE system or SUPER 3G, for example. In the radio communication system, used is carrier aggregation for integrating a plurality of base frequency blocks with a system band of the LTE system as a unit. Further, the radio communication system may be called IMT-Advanced or may be called 4G.

As shown in FIG. 5, the radio communication system 1 includes radio base station apparatuses 20A and 20B, and a plurality of first and second user terminals 10A and 10B that communicate with the radio base station apparatuses 20A and 20B, and is comprised thereof. The radio base station apparatuses 20A and 20B are connected to an upper station apparatus 30, and the upper station apparatus 30 is connected to a core network 40. Further, the radio base station apparatuses 20A and 20B are mutually connected by wired connection or wireless connection. The first and second user terminals 10A and 10B are capable of communicating with the radio base station apparatuses 20A and 20B in cells C1 and C2. In addition, for example, the upper station apparatus 30 includes an access gateway apparatus, radio network controller (RNC), mobility management entity (MME), etc., but is not limited thereto. In addition, among cells, when necessary, a plurality of base stations performs control of CoMP transmission.

The first and second user terminals 10A and 10B include LTE terminals and LTE-A terminals, and are described as first and second user terminals unless otherwise specified in the following description. Further, for convenience in description, the description is given while assuming that equipments that perform radio communications with the radio base station apparatuses 20A and 20B are the first and second user terminals 10A and 10B, and more generally, the equipments may be user equipments (UEs) including user terminals and fixed terminals.

In the radio communication system 1, as a radio access scheme, OFDMA (Orthogonal Frequency Division Multiple Access) is applied in downlink, while SC-FDMA (Single Carrier-Frequency Division Multiple Access) is applied in uplink, and the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

The downlink communication channels have the PDSCH (Physical Downlink Shared Channel) as a downlink data channel shared among the first and second user terminals 10A and 10B, and downlink L1/L2 control channels (PDCCH, PCFICH, PHICH). Transmission data and higher control information is transmitted on the PDSCH. Scheduling information of the PDSCH and PUSCH and the like is transmitted on the PDCCH (Physical Downlink Control Channel). The number of OFDM symbols used in the PDCCH is transmitted on the PCFICH (Physical Control Format Indicator Channel). ACK/NACK of HARQ to the PUSCH is transmitted on the PHICH (Physical Hybrid-ARQ Indicator Channel).

The uplink communication channels have the PUSCH (Physical Uplink Shared Channel) as an uplink data channel shared among the user terminals, and the PUCCH (Physical Uplink Control Channel) that is a control channel in uplink. Transmission data and higher control information is transmitted on the PUSCH. Further, on the PUCCH is transmitted downlink reception quality information (CQI), ACK/NACK and the like.

Figure 6:
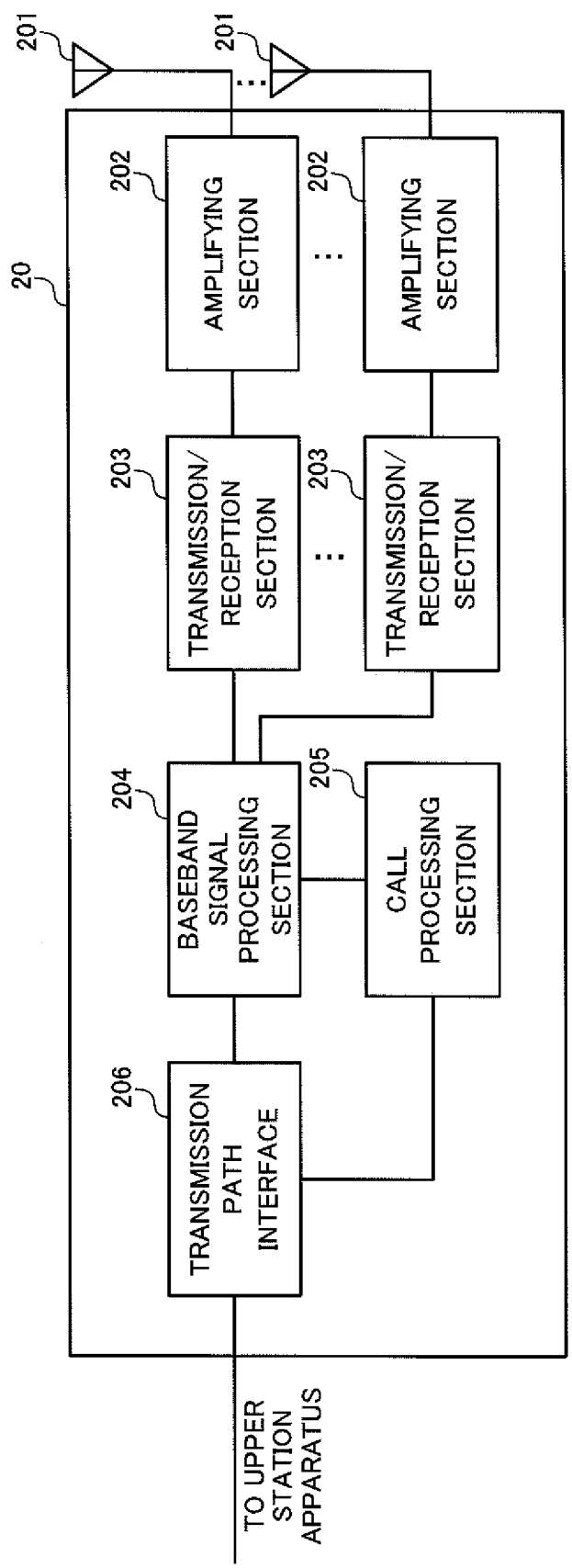
FIG. 6 is a diagram to explain an entire configuration of the radio base station apparatus.

Referring to FIG. 6, described is the entire configuration of the radio base station apparatus according to this Embodiment. In addition, the radio base station apparatuses 20A and 20B have the same configuration, and therefore, are described as the radio base station apparatus 20. Further, the first and second user terminals 10A and 10B described later also have the same configuration, and therefore, are described as the user terminal 10. The radio base station apparatus 20 is provided with transmission/reception antennas 201, amplifying sections 202, transmission/reception sections (notification section) 203, baseband signal processing section 204, call processing section 205 and transmission path interface 206. The transmission data to transmit from the radio base station apparatus 20 to the user terminal in downlink is input to the baseband signal processing section 204 via the transmission path interface 206 from the upper station apparatus 30.

The baseband signal processing section 204 performs, on the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, Inverse Fast Fourier Transform and the like.

Further, the baseband signal processing section 204 notifies user terminals 10 connected to the same cell of control information for each user terminal 10 to perform radio communications with the radio base station apparatus 20 on the broadcast channel. For example, the information for communications in the cell includes the system bandwidth in uplink or downlink, identification information (Root Sequence Index) of a root sequence to generate a signal of a random access preamble on the PRACH (Physical Random Access Channel), etc.

The transmission/reception section 203 converts the frequency of the baseband signal output from the baseband signal processing section 204 into a radio frequency band. The amplifying section 202 amplifies a radio frequency signal subjected to frequency conversion to output to the transmission/reception antenna 201. In addition, the transmission/reception section 203 constitutes reception means for receiving an uplink signal including information of a phase difference among a plurality of cells and PMI, and transmission means for performing Coordinated Multi-Point transmission on a transmission signal.

Meanwhile, with respect to signals transmitted from the user terminal 10 to the radio base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on transmission data included in the baseband signal received in uplink. The decoded signal is transferred to the upper station apparatus 30 via the transmission path interface 206.

The call processing section 205 performs call processing such as setting and release of the communication channel, status management of the radio base station apparatus 20, and management of radio resources.

Figure 7:
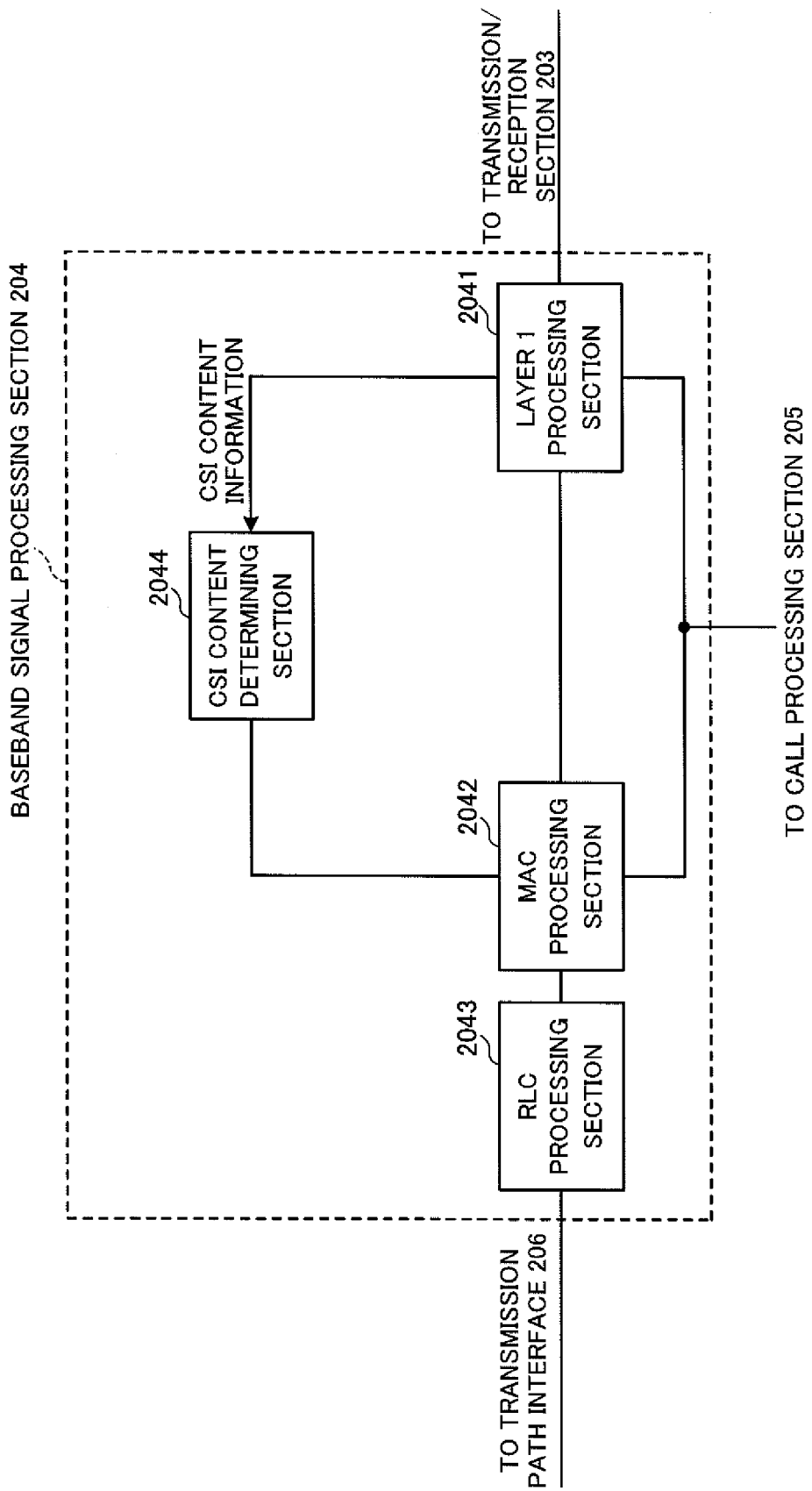
FIG. 7 is a functional block diagram corresponding to a baseband processing section of the radio base station apparatus.

FIG. 7 is a block diagram illustrating a configuration of the baseband signal processing section in the radio base station apparatus as shown in FIG. 6. The baseband signal processing section 204 is mainly comprised of a layer 1 processing section 2041, MAC processing section 2042, RLC processing section 2043, and CSI content determining section 2044.

The layer 1 processing section 2041 mainly performs processing concerning the physical layer. For example, on a signal received in uplink, the layer 1 processing section 2041 performs processing such as channel decoding, Discrete Fourier Transform (DFT), frequency demapping, Inverse Fast Fourier Transform (IFFT), and data demodulation. Further, on a signal to transmit in downlink, the layer 1 processing section 2041 performs processing such as channel coding, data modulation, frequency mapping and Inverse Fast Fourier Transform (IFFT).

The MAC processing section 2042 performs processing such as retransmission control in the MAC layer on the signal received in uplink, scheduling in uplink/downlink, selection of a transmission format of PUSCH/PDSCH, and selection of a resource block of PUSCH/PDSCH.

On packets received in uplink and packets to transmit in downlink, the RLC processing section 2043 performs segmentation of packets, concatenation of packets, retransmission control in the RLC layer and the like.

The CSI content determining section 2044 determines content of CSI to feed back to the serving cell and content of CSI to feed back to the coordinated cell. The CSI content determining section 2044 determines the content of channel state information so that the content of CSI to feed back to the serving cell is different from the content of CSI to feed back to the coordinated cell, more specifically, accuracy of feedback to the serving cell is higher than accuracy of feedback to the coordinated cell. By this means, it is possible to reduce overhead of CSI feedback without decreasing throughput. Further, when there is a plurality of options in the combination of content of CSI to feed back to the serving cell and content of CSI to feed back to the coordinated cell, the CSI content determining section 2044 determines the CSI content by the method (first method) of selecting a combination that maximizes feedback accuracy, or the method (second method) of determining the content of CSI to feed back to a coordinated cell based on reception quality notified from a user terminal. For example, the CSI content information is notified to the user terminal by higher layer signaling.

The entire configuration of the user terminal according to this Embodiment will be described next with reference to FIG. 8. The LTE terminal and the LTE-A terminal have the same configuration of principal part of hardware, and are not distinguished to describe. The user terminal 10 is provided with transmission/reception antennas 101, amplifying sections 102, transmission/reception sections (reception section) 103, baseband signal processing section 104 and application section 105.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104. The baseband signal processing section 104 performs mapping processing, transmission processing of retransmission control (HARQ), channel coding, DFT processing and IFFT processing. The transmission/reception section 103 converts the frequency of the baseband signal output from the baseband signal processing section 104 into a radio frequency band. Then, the amplifying section 102 amplifies the radio frequency signal subjected to frequency conversion to transmit from the transmission/reception antenna 101. In addition, the transmission/reception section 103 constitutes transmission means for transmitting information of a phase difference, information of a connected cell, selected PMI and the like to radio base station apparatuses eNBs of a plurality of cells and reception means for receiving a downlink signal.

Figure 8:
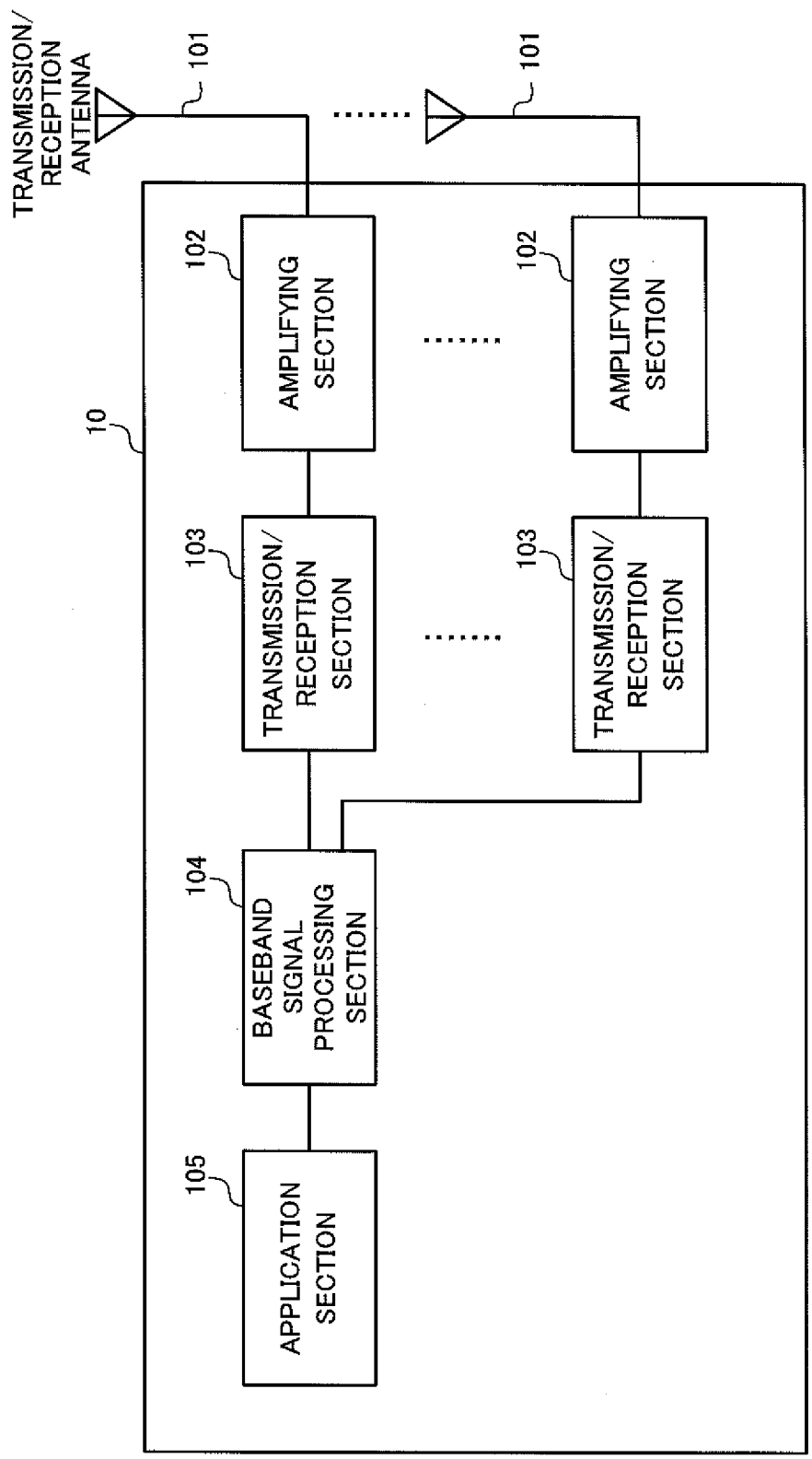
FIG. 8 is a diagram to explain an entire configuration of a user terminal.
Figure 9:
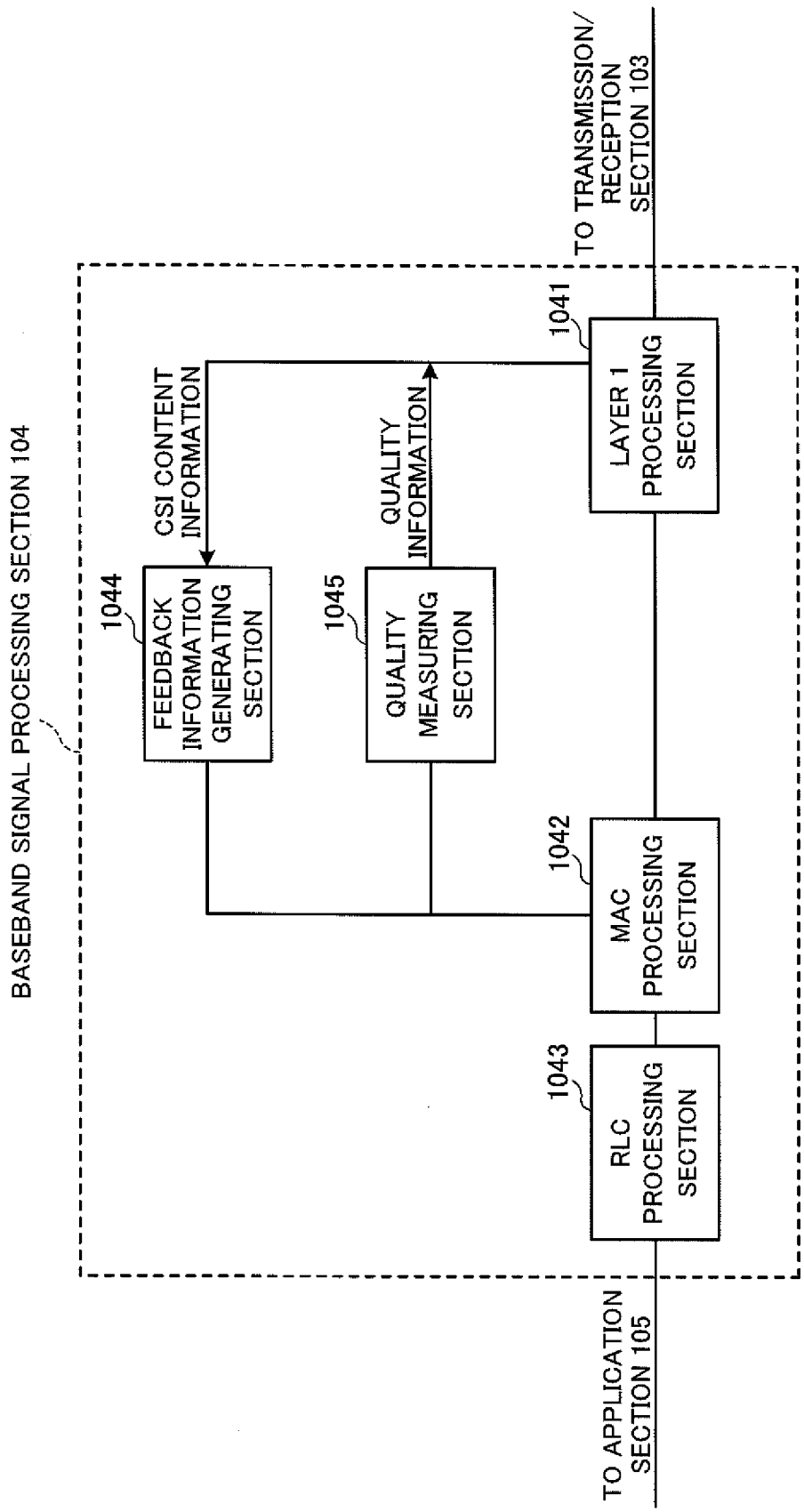
FIG. 9 is a functional block diagram corresponding to a baseband processing section of the user terminal.

FIG. 9 is a block diagram illustrating a configuration of the baseband signal processing section in the user terminal as shown in FIG. 8. The baseband signal processing section 104 is mainly comprised of a layer 1 processing section 1041, MAC processing section 1042, RLC processing section 1043, feedback information generating section 1044, and quality measuring section 1045.

The layer 1 processing section 1041 mainly performs processing concerning the physical layer. For example, on a signal received in downlink, the layer 1 processing section 1041 performs processing such as channel decoding, Discrete Fourier Transform (DFT), frequency demapping, Inverse Fast Fourier Transform (IFFT), and data demodulation. Further, on a signal to transmit in uplink, the layer 1 processing section 2041 performs processing such as channel coding, data modulation, frequency mapping and Inverse Fast Fourier Transform (IFFT).

The MAC processing section 1042 performs retransmission control (HARQ) in the MAC layer on the signal received in downlink, analysis of downlink scheduling information (identification of a transmission format of the PDSCH, identification of a resource block of the PDSCH) and the like. Further, the MAC processing section 1042 performs processing such as MAC retransmission control on a signal to transmit in uplink, and analysis of uplink scheduling information (identification of a transmission format of the PUSCH, identification of a resource block of the PUSCH).

On packets received in downlink and packets to transmit in uplink, the RLC processing section 1043 performs segmentation of packets, concatenation of packets, retransmission control in the RLC layer and the like.

The feedback information generating section 1044 generates CSI (feedback information). As the CSI, there are CSI (PMI, CDI, CQI) for each cell, inter-cell CSI (phase difference information, amplitude difference information), RI (Rank Indicator) and the like. When the CSI (particularly, CDI) is (1) the short-term covariance matrix, the option of content of CSI to feed back to the coordinated cell is defined by (2) the fine quantization channel matrix, (3) long-term covariance matrix, (4) PMI or (5) rough quantization channel matrix. The feedback information generating section 1044 generates the CSI according to the CSI content information notified from the radio base station apparatus. In other words, the feedback information generating section 1044 generates the CSI (CDI) defined so that accuracy of feedback to the serving cell is higher than accuracy of feedback to the coordinated cell. These pieces of CSI are transmitted to the radio base station apparatus as feedback on the PUCCH and PUSCH.

The quality measuring section 1045 measures quality information for each cell to perform CoMP transmission. As the quality information, there are RSRP, RSRQ, SINR and the like. The quality information is notified to the radio base station apparatus by higher layer signaling.

In the radio communication system having the above-mentioned configuration, first, the quality measuring section 1045 in the user terminal measures quality information (for example, RSRP) for each cell to perform CoMP transmission. For example, the user terminal notifies the radio base station apparatus of the quality information by higher layer signaling.

Next, the CSI content determining section 2044 in the radio base station apparatus determines CSI content based on reception quality notified from the user terminal. At this point, the CSI content determining section 2044 determines the content of channel state information so that the content of CSI to feed back to the serving cell is different from the content of CSI to feed back to the coordinated cell, more specifically, accuracy of feedback to the serving cell is higher than accuracy of feedback to the coordinated cell. Subsequently, the radio base station apparatus notifies the user terminal of the CSI content information, for example, by higher layer signaling.

In addition, when there is a plurality of options in the combination of content of CSI to feed back to the serving cell and content of CSI to feed back to the coordinated cell, the CSI content determining section 2044 selects a combination that maximizes feedback accuracy, or determines the content of CSI to feed back to the coordinated cell based on the reception quality notified from the user terminal.

Next, the feedback information generating section 1044 in the user terminal generates the CSI (CDI) with the CSI content notified from the radio base station apparatus. Then, thus generated CSI (CDI) is transmitted to radio base station apparatuses of cells to perform CoMP transmission as feedback for each cell together with the other CSI. By this means, it is possible to achieve reductions in overhead of feedback information in a state in which throughput in applying CoMP transmission is maintained.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-243023 filed on Nov. 7, 2011, entire content of which is expressly incorporated by reference herein.

The invention claimed is:

1. A radio communication system comprising: a plurality of radio base station apparatuses; and a user terminal configured to be able to perform Coordinated Multi-Point (CoMP) transmission/reception with the plurality of radio base station apparatuses, wherein
the radio base station apparatus includes a determination section that determines content of channel state information to transmit to a serving cell to perform CoMP transmission as feedback and content of channel state information to transmit to a coordinated cell as feedback such that accuracy of feedback to the serving cell is higher than accuracy of feedback to the coordinated cell, and a notification section that notifies the user terminal of the content of channel state information, and
the user terminal includes a generation section that generates feedback information based on content of channel state information notified from the radio base station apparatus, and a transmission section that transmits the feedback information to radio base station apparatuses of cells that perform CoMP transmission,
wherein, when there is a plurality of options on the content of channel state information to feed back to the coordinated cell, the determination section selects an option of the content of channel state information that maximizes the accuracy of feedback to the coordinated cell.

2. The radio communication system according to claim 1, wherein for the coordinated cell, the determination section determines the content of channel state information such that feedback accuracy is lower as reception quality is lower.

3. The radio communication system according to claim 1, wherein the plurality of options includes a short-term covariance matrix, a fine quantization channel matrix, a long-term covariance matrix, a precoding matrix indicator and a rough quantization channel matrix.

4. The radio communication system according to claim 1, wherein the CoMP transmission is Joint transmission type CoMP transmission.

5. A radio base station apparatus in a radio communication system provided with a plurality of radio base station apparatuses, and a user terminal configured to be able to perform Coordinated Multi-Point (CoMP) transmission/reception with the plurality of radio base station apparatuses, the radio base station comprising:
a determination section that determines content of channel state information to transmit to a serving cell to perform CoMP transmission as feedback and content of channel state information to transmit to a coordinated cell as feedback such that accuracy of feedback to the serving cell is higher than accuracy of feedback to the coordinated cell; and
a notification section that notifies the user terminal of the content of channel state information,
wherein, when there is a plurality of options on the content of channel state information to feed back to the coordinated cell, the determination section selects an option of the content of channel state information that maximizes the accuracy of feedback to the coordinated cell.

6. A user terminal in a radio communication system provided with a plurality of radio base station apparatuses, and the user terminal configured to be able to perform Coordinated Multi-Point (CoMP) transmission/reception with the plurality of radio base station apparatuses, the user terminal comprising:
a generation section that generates feedback information based on content of channel state information notified from a radio base station apparatus; and
a transmission section that transmits the feedback information to radio base station apparatuses of cells that perform CoMP transmission,
wherein the content of channel state information is determined such that accuracy of feedback to a serving cell is higher than accuracy of feedback to a coordinated cell, and
when there is a plurality of options on the content of channel state information to feed back to the coordinated cell, an option of the content of channel state information is selected that maximizes the accuracy of feedback to the coordinated cell.

7. A radio communication method in a radio communication system provided with a plurality of radio base station apparatuses, and a user terminal configured to be able to perform Coordinated Multi-Point (CoMP) transmission/reception with the plurality of radio base station apparatuses, the radio communication method comprising:
in a radio base station apparatus, determining content of channel state information to transmit to a serving cell to perform CoMP transmission as feedback and content of channel state information to transmit to a coordinated cell as feedback such that accuracy of feedback to the serving cell is higher than accuracy of feedback to the coordinated cell;
in the radio base station apparatus, notifying the user terminal of the content of channel state information;
in the user terminal, generating feedback information based on the content of channel state information notified from the radio base station apparatus; and
in the user terminal, transmitting the feedback information to radio base station apparatuses of cells that perform CoMP transmission,
wherein in the determining step, when there is a plurality of options on the content of channel state information to feed back to the coordinated cell, the radio base station apparatus selects an option of the content of channel state information that maximizes the accuracy of feedback to the coordinated cell.

* * * * *